UNITED STATES PATENT OFFICE 2,368,357

INSECTICIDE

Edward Harvill, Yonkers, N. Y., assignor to Boyce Thompson Institute for Plant Research, Inc., a corporation of New York No Drawing. Application May 12, 1942,
Serial No. 442,693

4 Claims. (Cl. 167—22)

This invention relates to insecticides and more particularly to insecticidal spray preparations or compositions particularly adapted for combating flies, mosquitoes, moths, roaches, and similar insects. This invention provides an improved insecticide or insecticidal composition comprising as a toxicant an organic thiocyanogen compound, which may be used either alone, or with an extract of a plant product, such as pyrethrum, in a mineral oil base or petroleum distillate for particular use as sprays and the like.

Pyrethrum extracts are widely used for the control of household insect pests and are generally employed in petroleum distillate sprays. Sprays containing pyrethrum extracts have a rapid paralyzing action on flies but give a relatively low kill as compared to the initial knockdown. It has been generally known that organic thiocyanogen compounds have insecticidal properties to a greater or lesser extent. Despite this knowledge, very few organic thiocyanogen compounds have been used in insecticidal compositions because of the fact that they either must be used in high concentrations, have unpleasant and annoying odors, or are toxic to warm-blooded animals in the concentrations in which they are used or have an irritating effect.

I have found that organic thiocyanogen compounds of substituted succinic acids are extremely effective as insecticides when used either alone, or in insecticidal preparations or compositions with a plant extract of pyrethrum, and especially when used in petroleum distillate sprays. These thiocyanogen compounds which I have discovered as toxicants in insecticides are remarkable in that they may be used in very low concentrations, for example, in concentrations as low as 0.10 per cent by volume. The compounds of the invention are, for the most part, colorless without objectionable odor or irritating or toxic effects, especially to humans and warm-blooded animals. They do not cause irritation and dermatitis upon contact with living animal tissue or skin. Because of their extreme toxicity to insects and their relative harmlessness to animals, the compounds are well adapted for insecticidal purposes.

The substituted thiocyanogen succinic acids I have found effective as an insecticide for the purposes of the invention have the following basic formula:

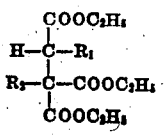

wherein $R_1$ represents hydrogen or an alkyl radical, as for example methyl, ethyl, propyl, or butyl, etc., and where $R_2$ represents a thiocyanoethyl, thiocyanopropyl, or thiocyanohexyl radical.

The following formulae illustrate the aforementioned basic formula having various $R_1$ and $R_2$ substitutions forming compounds of the invention:

COMPOUND No. I

Ethyl-alpha-carboethoxy-alpha-(gamma-thiocyano propyl)-beta-methyl succinate

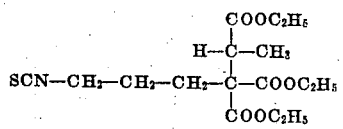

COMPOUND No. II

Ethyl-alpha-carboethoxy-alpha-(gamma-thiocyano propyl)-succinate

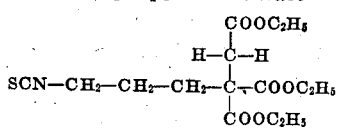

COMPOUND No. III

Ethyl-alpha-carboethoxy-alpha-(gamma-thiocyano propyl)-beta-butyl succinate

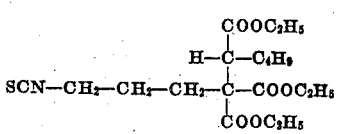

The above compounds may be prepared, for example by reacting ethyl sodio malonate with an aliphatic alpha halogen ester to give an alpha beta substituted succinic ester. The ethyl sodio succinate is then reacted with a polymethylene halide to give an alpha carboethoxy, alpha halogenalkyl, beta alkyl succinic ester. This compound is then refluxed with potassium thiocyanate to yield the desired thiocyanogen compound.

Various insecticidal spray compositions of the invention may be prepared, for example, by dissolving a compound of the kind described above in a mineral oil base such as odorless kerosene, naphtha, etc. In addition to petroleum distillate, a secondary organic solvent such as ethyl alcohol, acetone, ethylene glycolmonoethyl ether and the like may be used to bring about solution of the thiocyanogen succinic compounds in petroleum distillates in the case of those compounds whose solubility in odorless kerosene, naphtha, etc. is slight. The secondary organic solvent should be a material unreactive with and capable of dissolving the substituted thiocyanogen succinic acid. The aforementioned secondary organic solvents meet the requirements with respect to the compounds of the invention, are non-reactive with pyrethrum and are non-injurious to the skin and general health of humans. The compounds of the invention may be used to fortify liquid extracts of pyrethrum, and to this end, I may incorporate a compound of the invention in an organic solution of one of these materials either directly or in the form of a solution of a secondary organic solvent.

The following examples illustrate the effectiveness of various insecticidal compositions of the invention. The effectiveness of the compositions was determined by the standard Peet-Grady method with five-day-old flies as described at pages 92 to 98 of "Pyrethrum Flowers" by C. B. Gnadinger, 1936 edition. The official test insecticide (O. T. I.) which served as the standard of comparison contained 0.10 per cent of pyrethrum in the same mineral oil base as the other compositions.

| Compound | Conc. of compound (per cent by vol.) | Conc. of pyrethrum (per cent by wt.) | Per cent knockdown (10 min.) | Per cent kill (24 hrs.) | Per cent O.T.I. | Rating |
|---|---|---|---|---|---|---|
| No. I | 0.50 | -------- | 98.2 | 66.0 | 40.7 | AA |
|  | 0.50 | 0.05 | 100 | 98.1 | 37.7 | AA |
|  | 0.30 | 0.03 | 100 | 68.5 | 41.7 | AA |
|  | 0.20 | 0.02 | 99.4 | 47.8 | 41.7 | A |
|  | 0.10 | 0.03 | 100 | 43.4 | 41.7 | B |
| No. II | 1.0 | 0.05 | 100 | 93.3 | 36.8 | AA |
|  | 0.25 | 0.05 | 100 | 64.3 | 48.4 | AA |
| No. III | 0.60 | 0.05 | 100 | 62.2 | 43.8 | AA |

The first example illustrates the effectiveness of ethyl alpha-carboethoxy-alpha-(gamma-thiocyano propyl)-beta-methyl succinate when used as a spray containing no other toxicant.

I claim:

1. An insecticidal composition comprising a compound having the formula

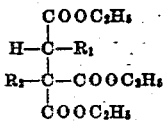

wherein $R_1$ represents a member of the group consisting of hydrogen, methyl, ethyl, propyl and butyl, and $R_2$ represents a member of the group consisting of beta thiocyanoethyl, gamma thiocyanopropyl, and 6-thiocyanohexyl dissolved in an organic spray liquid.

2. An insecticidal composition comprising a compound having the formula

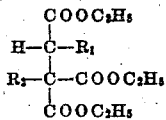

wherein $R_1$ represents a member of the group consisting of hydrogen, methyl, ethyl, propyl and butyl, and $R_2$ represents a member of the group consisting of beta thiocyanoethyl, gamma thiocyanopropyl, and 6-thiocyanohexyl and an extract of pyrethrum.

3. An insecticidal composition comprising an extract of pyrethrum in a mineral oil base, a compound toxic to insects having the formula

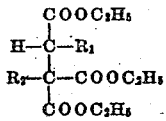

wherein $R_1$ represents a member of the group consisting of hydrogen, methyl, ethyl, propyl and butyl, $R_2$ represents a member of the group consisting of beta thiocyanoethyl, gamma thiocyanopropyl and 6-thiocyanohexyl, and a secondary organic solvent for the compound.

4. An insecticidal preparation according to claim 3 which comprises as a secondary organic solvent a compound of the group consisting of ethyl alcohol, acetone and ethylene glycolmonoethyl ether.

EDWARD HARVILL.